J. B. VIRGA.
TIRE PROTECTOR.
APPLICATION FILED MAY 10, 1920.
1,357,132.
Patented Oct. 26, 1920.
2 SHEETS—SHEET 1.
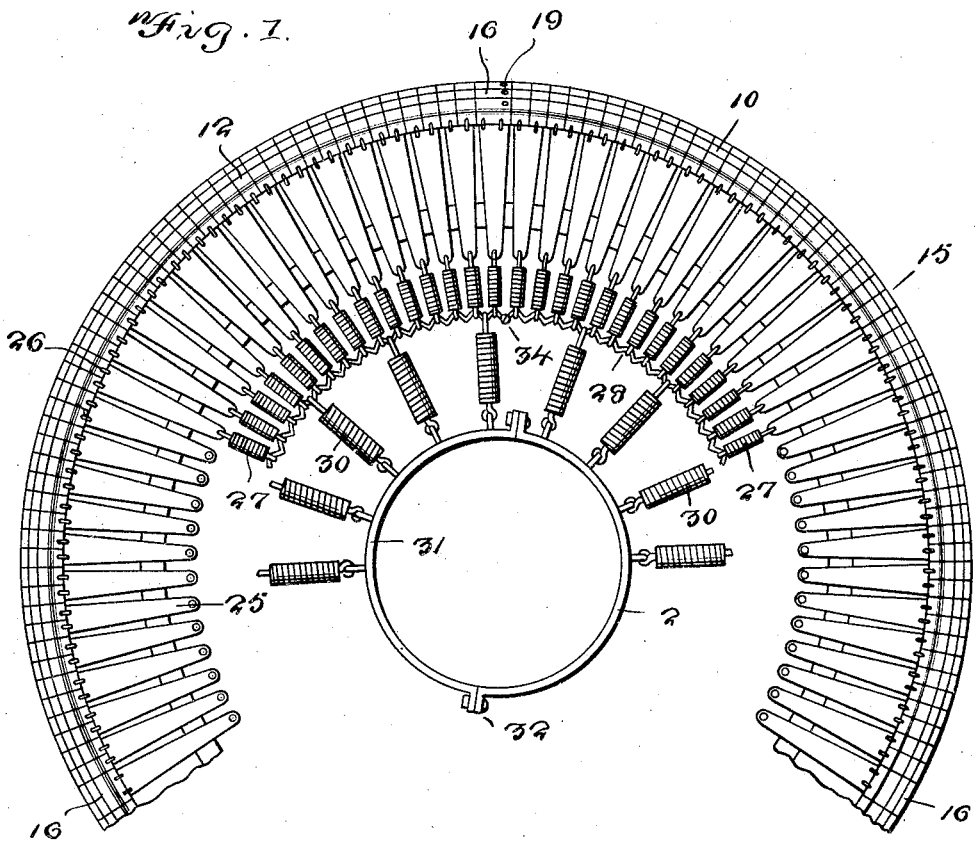
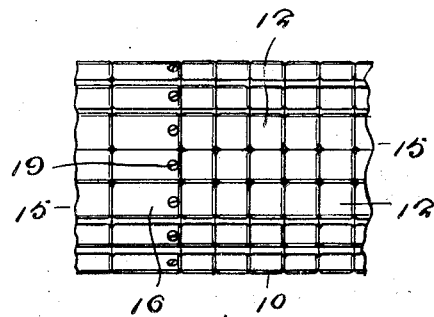
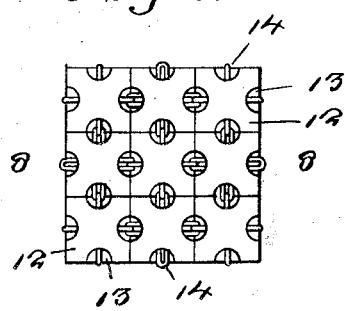
John B. Virga
INVENTOR
WITNESS:
BY
ATTORNEY

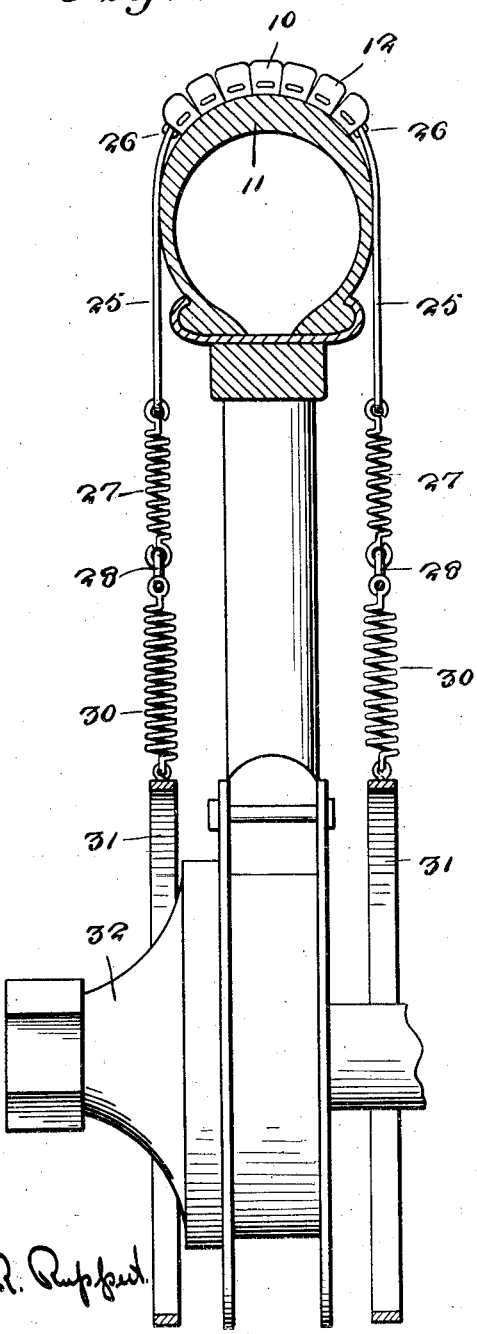

UNITED STATES PATENT OFFICE.

JOHN B. VIRGA, OF WASHINGTON, DISTRICT OF COLUMBIA, ASSIGNOR OF ONE-HALF TO FILIPPE DE BELLA, OF WASHINGTON, DISTRICT OF COLUMBIA.

TIRE-PROTECTOR.

1,357,132.  Specification of Letters Patent.  Patented Oct. 26, 1920.

Application filed May 10, 1920. Serial No. 380,321.

*To all whom it may concern:*

Be it known that I, JOHN B. VIRGA, a subject of the King of Italy, residing at Washington, District of Columbia, have invented new and useful Improvements in Tire-Protectors, of which the following is a specification.

This invention relates to protectors for pneumatic tires, the object being to provide means which may be readily secured to a tire for the purpose of protecting it from puncture and resisting wear.

Another object is the provision of a tire protector having a relatively heavy flexible tread surface for the protection of the tire tread and side plates connected to the protector tread and having a flexible connection with an annulus, to yieldingly hold the protector upon the tire and permit it to respond to the action thereof, so that its resiliency and easy riding qualities will not be impaired.

With the above and other objects in view, the invention further includes the following novel features and details of construction, to be hereinafter more fully described, illustrated in the accompanying drawings and pointed out in the appended claims.

In the drawings:

Figure 1 is a fragmentary side elevation of the invention.

Fig. 2 is a transverse sectional view of the same.

Fig. 3 is a fragmentary plan view of a portion of the protector tread.

Fig. 4 is a similar view looking at the reverse side of the tread.

Fig. 5 is a detailed elevation of one of the blocks which connect the tread sections together.

Fig. 6 is a central longitudinal sectional view of the block shown in Fig. 5.

Fig. 7 is a fragmentary view of the adjacent ends of one of the positioning rings.

Fig. 8 is an enlarged section on the line 8—8 of Fig. 4.

Referring to the drawings in detail, wherein like characters of reference denote corresponding parts, the reference character 10 indicates generally the tread portion of the protector which is designed to surround the tread of the tire 11. This tread portion is preferably formed of metallic blocks which are secured together so as to provide for independent relative movement, whereby the tread section 10 will be rendered flexible. These blocks are of substantially cubical formation and are shown at 12. They are preferably arranged in vertical and transverse rows as shown in the drawings. In order to secure the blocks 12 together, each block is recessed as shown at 13 and located in each of these recesses is a loop or staple 14 which is engaged with a loop or staple of the next adjacent block so as to provide a free pivotal connection between each edge of the blocks. By arranging the loops or staples 14 within the recesses 13, the inner face of the protector presents vertically a flush surface for contact with the tread of the tire 11.

The tread 10 of the protector is preferably divided into sections 15 and these sections are connected by blocks 16, the latter being of substantially twice the length of the blocks 12 and having their opposite ends connected to the adjacent ends of said blocks 12 of the tread sections.

The purpose of dividing the tread portion 10 of the protector into the sections 15 is to provide at intervals around the tread a flexible portion which will permit the tread portion 10 of the protector to respond to the movements and expansion and contraction of the tire 11. For this purpose, each of the blocks has one end connected to the adjacent end of each section 15 by means of a link 17, the said link engaging one of the loops or staples 14 and entering a socket 18 formed in the block 16. At this point the link engages a screw or other member 19 which is carried by the block. The opposite end of the block 16 is recessed as shown at 20 and located within this recess is a sleeve 21 which is closed at its opposite end. This sleeve is capable of sliding movement within the recess 20 and provides a housing for a spring 22. One end of this spring is secured to the block 16 by means of a pin 23, while the opposite end projects through the closed end of the sleeve 21 and is formed into a hook 24 for engagement with one of the loops or staples 14 of the adjacent block 12.

Secured to the opposite side edges of the tread portion 10 are protecting plates 25. One end of these plates receives staples 26 carried by the blocks 12, while the opposite end of the plates are connected to one end of coiled springs 27. The opposite ends of these springs engage a positioning ring 28, the said ring being provided with spaced seats 29 which receive the ends of the springs 27 and hold these ends in proper separated relation so that the inner ends of the plates 25 are properly spaced apart. The positioning ring 28 has also connected thereto the outer ends of relatively heavy springs 30, whose inner ends are connected to a ring 31 which is adapted to surround the hub 32 of a wheel. The side plates 25 thus not only afford means for securing the tread portion 10 in position upon the tire but also serve as a protection to the sides of the tire and prevent it from being worn by contact with a curbing. In order to permit the protector to be secured upon the tire, the ring 31 is formed in semi-circular sections which are detachably connected together as shown at 32, while the positioning ring 28 is likewise formed of semi-circular sections the ends of these sections being formed with eyes 33 for the reception of fastening devices 34. The tread portion 10 of the protector is in the form of a split flexible band which is shaped to conform to the shape of the tire and has its adjacent ends detachably connected by means of fastening devices 19. The blocks 12 of the portion 10 are so proportioned that the outer edges of certain of the longitudinal rows will be spaced apart to permit of a free movement of the tread portion as when the tire 11 is depressed by the weight of the vehicle to which it is attached.

The invention is susceptible of various changes in its form, proportions and minor details of construction and the right is herein reserved to make such changes as properly fall within the scope of the appended claims.

Having described the invention what is claimed is:—

1. A tire protector comprising a tread formed of a plurality of members, means for connecting the members together in a manner to permit of relative independent movement, said members being arranged in sections and blocks interposed between the sections, means for securing one end of the blocks to the sections, a spring housed within the blocks and connected to the ends of the adjacent sections and means for removably securing the tread upon a tire.

2. A protector comprising a tread formed of a plurality of members, means for securing the members together in a manner to permit of relative independent movement, side protecting plates secured to the opposite side edges of the tread, concentrically arranged inner and outer spaced rings disposed upon opposite sides of the tread, springs connecting the outer ring and each of the side protecting plates, springs connecting the inner and outer rings and spaced alternately arranged seats formed in the outer ring for engagement with the springs to hold the latter in proper spaced position.

In testimony whereof I affix my signature.

JOHN B. VIRGA.